US011190686B2

(12) United States Patent
Miyazawa (10) Patent No.: US 11,190,686 B2
(45) Date of Patent: Nov. 30, 2021

(54) CONTROL APPARATUS AND CONTROL METHOD FOR IMAGE DETECTION WITH BLUR CORRECTION

(71) Applicant: CANON KABUSHIKI KAISHA, Tokyo (JP)

(72) Inventor: Hitoshi Miyazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/817,008

(22) Filed: Mar. 12, 2020

(65) Prior Publication Data

US 2020/0296294 A1   Sep. 17, 2020

(30) Foreign Application Priority Data

Mar. 15, 2019 (JP) .............................. JP2019-048377

(51) Int. Cl.
*H04N 5/232* (2006.01)

(52) U.S. Cl.
CPC ..... *H04N 5/23254* (2013.01); *H04N 5/23218* (2018.08); *H04N 5/23261* (2013.01); *H04N 5/23287* (2013.01); *H04N 5/23299* (2018.08); *H04N 5/232122* (2018.08); *H04N 5/232121* (2018.08)

(58) Field of Classification Search
None
See application file for complete search history.

(56) References Cited

U.S. PATENT DOCUMENTS

| | | | | |
|---|---|---|---|---|
| 2005/0270380 A1* | 12/2005 | Tomita | ............... | H04N 5/23248 348/208.99 |
| 2010/0123783 A1* | 5/2010 | Lin | ..................... | H04N 5/2328 348/180 |
| 2010/0245656 A1* | 9/2010 | Fujii | .................. | H04N 5/23212 348/345 |
| 2014/0111658 A1* | 4/2014 | Watanabe | .......... | H04N 5/23264 348/208.1 |
| 2015/0146011 A1* | 5/2015 | Tsubusaki | .......... | H04N 5/23219 348/169 |
| 2015/0237260 A1* | 8/2015 | Mukunashi | ........ | H04N 5/23287 348/208.11 |
| 2017/0171475 A1* | 6/2017 | Shibata | ................ | H04N 5/2328 |
| 2017/0214838 A1* | 7/2017 | Miyazawa | ......... | H04N 5/23287 |
| 2017/0214855 A1* | 7/2017 | Miyazawa | ......... | H04N 5/23287 |
| 2017/0353667 A1* | 12/2017 | Miyahara | ........... | H04N 5/23258 |
| 2018/0103207 A1* | 4/2018 | Miyazawa | ......... | H04N 5/23219 |
| 2020/0236284 A1* | 7/2020 | Miyazawa | ......... | H04N 5/23254 |

FOREIGN PATENT DOCUMENTS

JP    2006-317848 A    11/2006

* cited by examiner

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

A control apparatus includes a detecting unit configured to detect an object from an obtained image signal, an obtaining unit configured to obtain a variation amount of a focal length for reducing a size variation of the object detected by the detecting unit, and a correcting unit configured to obtain a blur correction amount for controlling an image stabilizer configured to correct a blur, based on the blur detected by a shake detector and the variation amount of the focal length obtained by the obtaining unit.

20 Claims, 8 Drawing Sheets

CONTROL APPARATUS AND CONTROL METHOD FOR IMAGE DETECTION WITH BLUR CORRECTION

BACKGROUND OF THE INVENTION

Field of the Invention

The present invention relates to an imaging apparatus that can zoom during follow-shot (panning).

Description of the Related Art

An imaging apparatus having a follow-shot assisting function has conventionally been known. Japanese Patent Laid-Open No. ("JP") 2006-317848 discloses a method for detecting a difference between an object velocity and a panning velocity of an imaging apparatus, and for correcting a shift amount corresponding to the difference using an image stabilization function. For advanced panning, an imaging apparatus that can zoom during follow-shot (panning) (referred to as perform "zoom panning" hereinafter) is known. The zoom panning is imaging where a focal length varies so as to fix a size of an object being captured relative to an imaging angle of view during the panning.

The method disclosed in JP 2006-317848 detects an object blur that is a shift between an object and an imaging apparatus, using a motion vector of an image and an angular velocity. However, during the zoom panning, since the focal length varies so as to fix the object size being captured relative to the imaging angle of view, it is required to adjust a blur correction amount for the object based on a variation amount of the focal length, otherwise, the object blur increases.

SUMMARY OF THE INVENTION

The present invention provides a control apparatus, an imaging apparatus, and a control method, each of which can accurately correct an object blur during zoom panning.

A control apparatus according to one aspect of the present invention includes a detecting unit configured to detect an object from an obtained image signal, an obtaining unit configured to obtain a variation amount of a focal length for reducing a size variation of the object detected by the detecting unit, and a correcting unit configured to obtain a blur correction amount for controlling an image stabilizer configured to correct a blur, based on the blur detected by a shake detector and the variation amount of the focal length obtained by the obtaining unit.

An imaging apparatus and a lens apparatus each of which includes the above control apparatus, a control method corresponding the control apparatus, and a storage medium storing a computer program that enables a computer to execute the control method corresponding the control apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
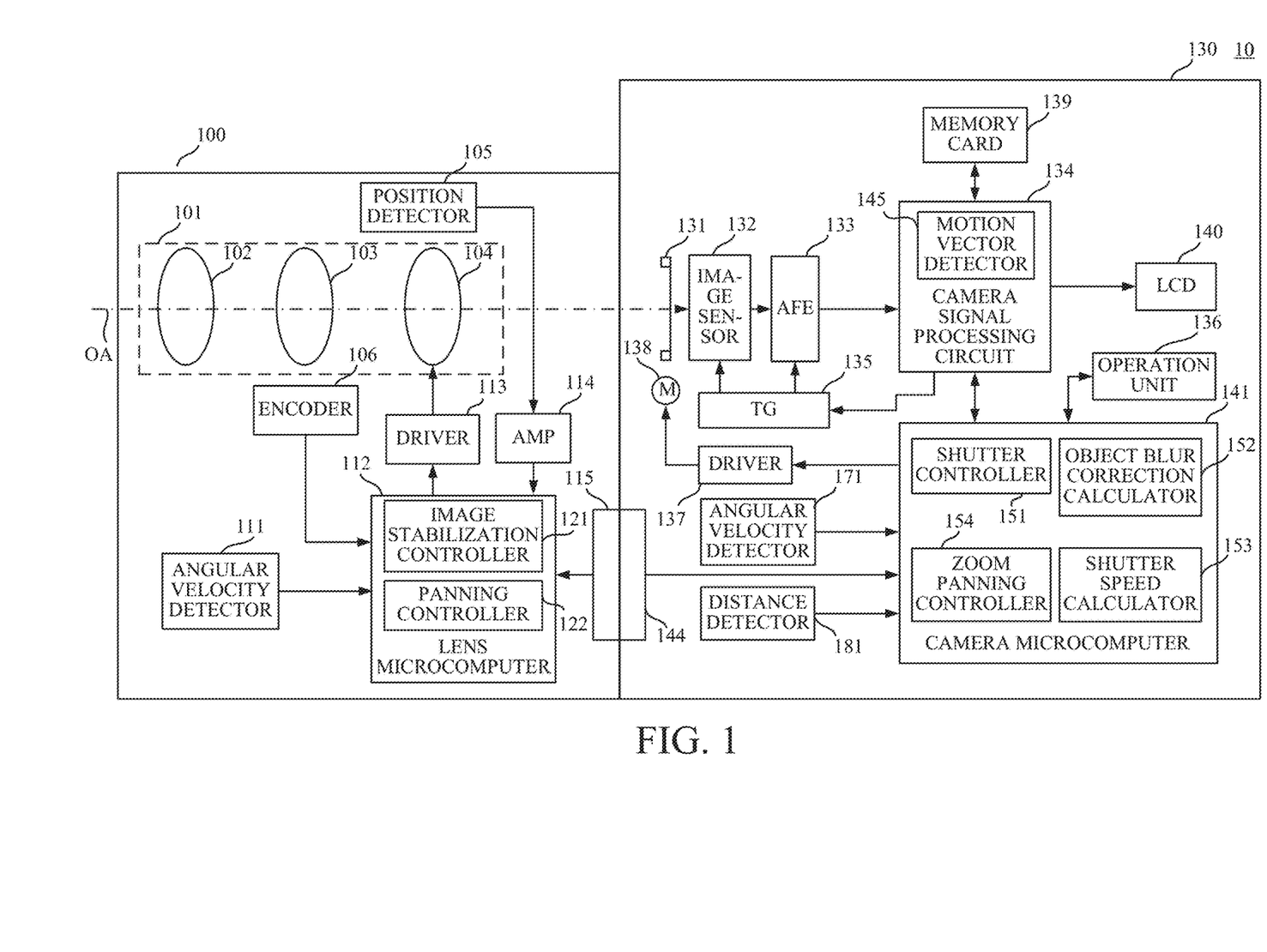
FIG. 1 is a block diagram of an imaging system according to each embodiment.

Referring now to FIG. 1, a description will be given of a configuration of a camera system (imaging system) 10 according to this embodiment. FIG. 1 is a block diagram of the camera system 10. The camera system 10 includes a camera body (imaging apparatus) 130 and an interchangeable lens (lens apparatus) 100 detachably attachable to the camera body 130. Although the camera system 10 in this embodiment includes the camera body 130 and the interchangeable lens 100 detachably attachable to the camera body 130, the present invention is not limited to this embodiment and is applicable to an imaging apparatus in which a camera body and a lens apparatus are integrated with each other.

The interchangeable lens 100 includes a lens unit (imaging lens) 101. The lens unit 101 includes a main imaging optical system 102, a zoom lens 103 having a variable focal length, and a shift lens 104 that moves in a direction orthogonal to an optical axis OA so as to optically correct, with respect to the optical axis OA, an image blur caused by a shake in the camera system 10. In this embodiment, the shift lens 104 includes the shift lens 104 as an image stabilizer configured to correct an image blur. However, an image sensor 132 described later may function as an image stabilizer.

The interchangeable lens 100 includes an encoder (zoom encoder) 106 configured to detect a position of a zoom lens (zoom lens unit) 103, and a position detector (position sensor) 105, such as a Hall element, configured to detect a position of a shift lens (shift lens unit) 104. The interchangeable lens 100 includes an angular velocity detector (shake detector) 111, such as a gyro (angular velocity sensor), configured to detect a shake in the camera system 10 (interchangeable lens 100), and a microcomputer (lens microcomputer) 112 configured to control a lens system. The interchangeable lens 100 includes a driver (driving unit) 113 configured to drive the shift lens, and an amplifier circuit (AMP) 114 configured to amplify output of the position detector 105 of the shift lens 104. The interchangeable lens 100 includes a mount contact portion 115 with the camera body 130.

The lens microcomputer 112 includes an image stabilization controller 121 configured to control image stabilization, and a panning controller 122 configured to properly control blur correction at the time of the panning. The lens microcomputer 112 controls a focus lens, a diaphragm, and the like, but a description for those controls will be omitted here. For the image stabilization, the lens microcomputer 112 detects and corrects a shake regarding two axes that are orthogonal to each other, for example, a vertical direction and a horizontal direction. As the detection and the correction have a same configuration for each of the two axes, this embodiment will describe them regarding only one axis. As described above, the camera system 10 in this embodiment has an image stabilizing apparatus configured to correct an image blur by driving an optical element in a direction orthogonal to the optical axis OA (a direction different from the optical axis OA).

The camera body 130 includes a shutter 131, an image sensor 132 such as a CMOS sensor, an analog signal processing circuit (AFE) 133, and a camera signal processing circuit 134. The camera body 130 includes a timing generator (TG) 135 configured to set operation timings for the image sensor 132 and the analog signal processing circuit 133. The camera body 130 includes an operation unit 136 composed of a power switch, a release switch, and the like. The camera body 130 includes a camera system controlling microcomputer (referred to as a camera microcomputer hereinafter) 141 configured to control an entire system of the camera body 130. The camera body 130 includes a driver (driving unit) 137 configured to drive a motor that operates the shutter, and a shutter driving motor 138. The camera body 130 includes a memory card 139 configured to record a captured image, a liquid crystal panel (LCD) 140 configured to monitor and display the captured image and the like, and a mount contact portion 144 with the interchangeable lens 100. The lens microcomputer 112 and the camera microcomputer 141 perform a serial communication at a predetermined timing via the mount contact portions 115 and 144. The interchangeable lens 100 includes an angular velocity detector (shake detector) 171, such as a gyro, configured to detect a shake in the camera system 10 (or the camera body 130), and a distance detector 181.

The image sensor 132 photoelectrically converts an object image (optical image) formed via the lens unit (imaging optical system) 101 in the interchangeable lens 100. The camera signal processing circuit 134 includes a motion vector detector 145 configured to detect a motion of an object based on an output from the image sensor 132. The camera microcomputer 141 includes a shutter controller 151, an object blur correction calculator (correcting unit) 152 configured to calculate (obtain) a blur correction amount of an object, and a shutter speed calculator 153 configured to calculate a shutter speed suitable for panning. The camera microcomputer 141 includes a zoom panning controller 154 configured to control a zoom position so as to reduce an object size variation in a captured image. The zoom panning controller 154 may control the zoom position so as to fix an object size in each frame in an imaging angle of view.

When the operation unit 136 turns on the power of the camera body 130, the camera microcomputer 141 detects a state change and provides controls for the power supply and initial setting to each circuit in the camera body 130. The power is also supplied to the interchangeable lens 100, and the lens microcomputer 112 controls the initial setting in the interchangeable lens 100. Thereafter, a communication starts between controls of the lens microcomputer 112 and the camera microcomputer 141 at predetermined timing. In this communication, communication data transmitted from the camera body 130 to the interchangeable lens 100 includes a state of the camera body 130, an imaging setting, and the like. Communication data transmitted from the interchangeable lens 100 to the camera body 130 includes focal length information and angular velocity information of the interchangeable lens 100. Each communication data is transmitted and received at necessary timing. In the interchangeable lens 100, an angular velocity detector 111 detects a shake in the camera system 10 caused by a hand shake or the like, and the image stabilization controller 121 operates the image stabilization.

Figure 2:
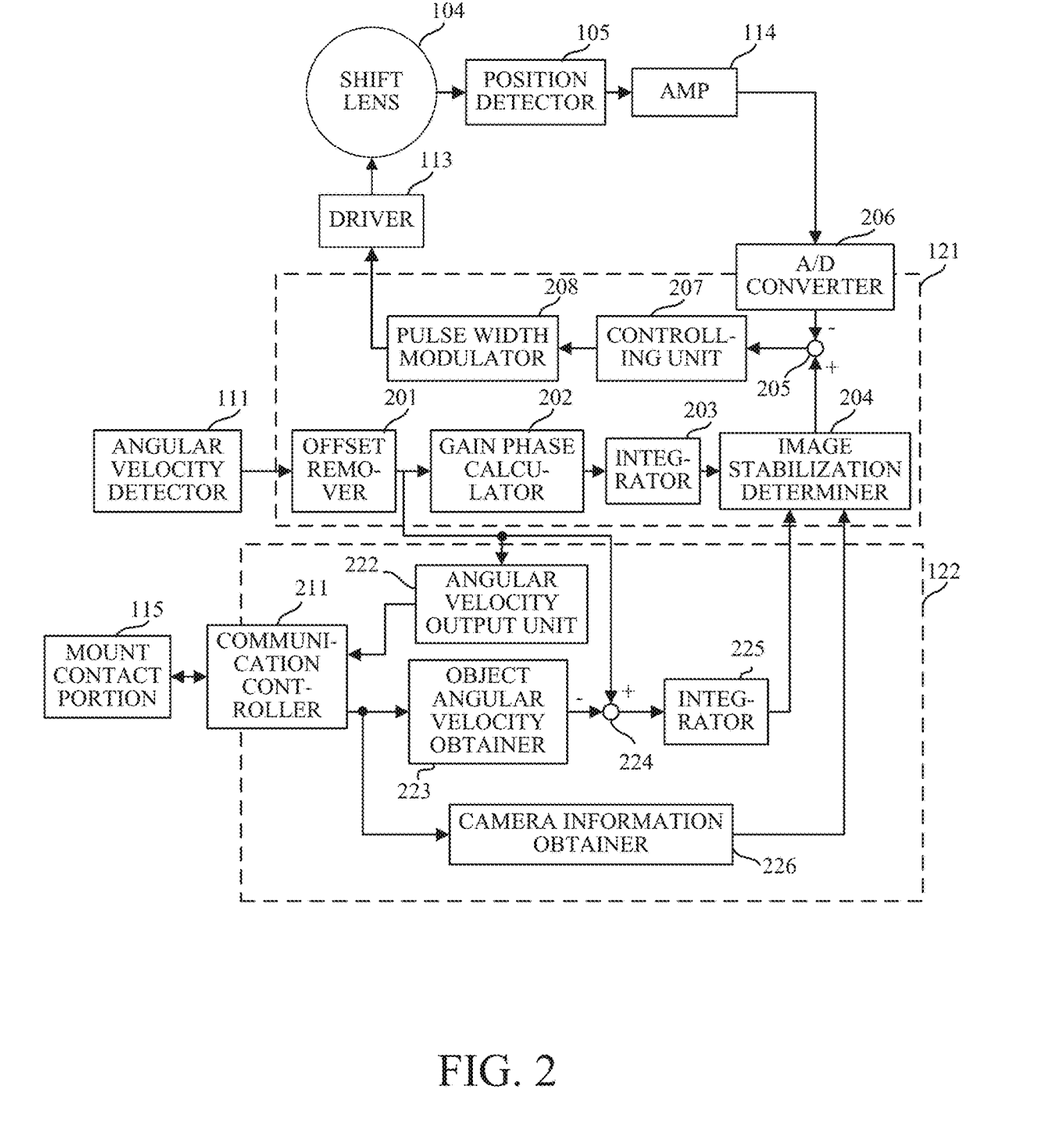
FIG. 2 is a control block diagram of an optical correction system according to each embodiment.

A description will now be given of the image stabilization operation with reference to FIG. 2. FIG. 2 is a control block diagram of an optical correction system (the image stabilizing apparatus and the image stabilizer) configured to operate the image stabilization. Those elements in FIG. 2, which are corresponding elements in FIG. 1, will be designated by the same reference numerals, and a description thereof will be omitted.

The image stabilization controller 121 includes an offset remover 201, a gain phase calculator 202, an integrator 203, an image stabilization determiner 204, a subtractor 205, an A/D converter 206, a controlling unit 207, and a pulse width modulator 208. The panning controller 122 includes a communication controller 211, an angular velocity output unit 222, an object angular velocity obtainer 223, a subtractor 224, an integrator 225, and a camera information obtainer 226.

The offset remover 201 is a filter operator composed of a high-pass filter (HPF) or the like and removes a DC component included in an output from the angular velocity detector 111. The gain phase calculator 202 includes an amplifier configured to amplify, with a predetermined gain, an angular velocity signal from which the offset remover 201 has removed an offset component, and a phase compensation filter. The integrator 203 has a function of changing its characteristic in an arbitrary frequency band, and integrates an output of the gain phase calculator 202 to calculate a driving amount of the shift lens 104. When the angular velocity of the angular velocity detector 111 is equal to or larger than a predetermined value and a predetermined time has elapsed, it is determined that the panning is being performed, and a cut-off frequency of the HPF in the offset remover 201 is gradually changed to a high frequency side. By gradually changing the cut-off frequency to the high frequency side, the target signal for the image stabilization control is gradually reduced so that the optical correction system returns to the optical center position. If the optical correction system corrects the angular velocity large enough to determine that the panning is in progress, without changing the cutoff frequency to the high frequency side, the optical correction system reaches a correction limit point and the user may view unnatural changes in an angle of view. The above configuration solves this problem.

The image stabilization determiner 204 switches a control signal for driving the shift lens 104 according to an output signal of the camera information obtainer 226. For example, when the user selects the panning mode as an imaging mode for the camera body 130, image stabilization determiner 204 selects the output of the integrator 225 calculated by the panning controller 122. When the user selects an imaging mode other than the panning mode, the image stabilization determiner 204 selects the output of the integrator 203 calculated by the image stabilization controller 121. The subtractor 205 subtracts, from the output of the image stabilization determiner 204, data digitized at the A/D converter 206 where the data corresponds to a value made by amplifying, at the amplifier circuit 114, the output of the position detector 105 which detects the position of the shift lens 104. The subtractor 205 outputs deviation data to the controlling unit 207.

The controlling unit 207 includes an amplifier that amplifies the deviation data from the subtractor 205 at the predetermined gain, and a phase compensation filter. In the controlling unit 207, the amplifier and the phase compensation filter perform signal processing for the deviation data output from the subtractor 205, and the processed data is output to the pulse width modulator 208. The pulse width modulator 208 modulates the output data from the controlling unit 207 into a waveform that changes a duty ratio of a pulse wave (PWM waveform), and outputs the modulated data to the driver 113 configured to drive the shift lens 104. The shift lens driving driver 113 is a voice coil type motor for driving the shift lens 104. The shift lens 104 is driven in a direction orthogonal to the optical axis OA according to the output of the pulse width modulator 208.

The object blur correction calculator 152 in the camera microcomputer 141 detects a relative shift between the object and the camera system 10 using a motion vector detector 145 to detect a motion between different frames as a vector. The object blur correction calculator 152 divides the detected vector into an object group vector and a background group vector. The object blur correction calculator 152 extracts only a main object vector from the object group vector. That is, when there are a plurality of objects on a screen (image), an object targeted by the user is set as the main object, and the main object vector only is extracted.

The object vector varies within the main object. For example, in FIG. 3A, the vectors are different between in a front part 303 of the object and in a rear part 304 of the object. If the camera system 10 and the object moves together at the same speed while the camera system 10 maintains its direction (in other words, the camera system 10 does not rotate), the front part and the rear part of the object have the same vectors. However, in the actual movement of the camera system 10, the camera system 10 does not swing in a parallel direction, but the camera system 10 pans with a certain angle. Thus, when viewed from the camera system 10, the vectors are different in the front part and in the rear part of the object. The influence is more significant as the focal length is at the wider angle side and an imaging distance is shorter.

In contrast, if an imaging distance is infinitely long, it is equivalent to perform imaging by running parallel to the object, and thus the entire object tends to stop. A vector of part in the main object to be stopped is selected as a final object vector. This embodiment converts the object vector into an object angular velocity using information such as a focal length and a frame rate. The object blur correction calculator 152 sends the calculated object angular velocity to the lens microcomputer 112, and the shift lens 104 stabilizes the image based on the object angular velocity. Thereby it is possible to obtain a panned image without an object blur.

Figures 3A, 3B, 4A, 4B:
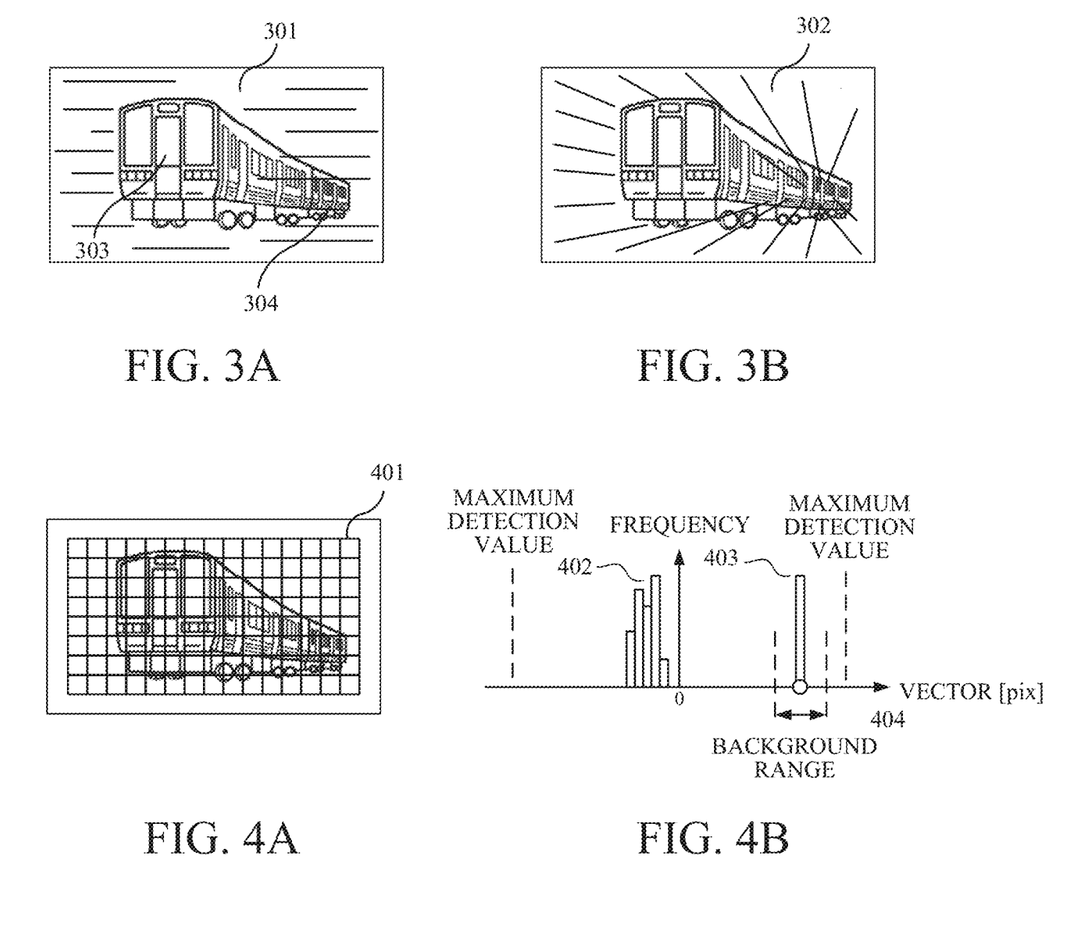
FIGS. 3A and 3B are explanatory diagrams of zoom panning according to each embodiment.
FIGS. 4A and 4B are explanatory diagrams of an object vector detection method according to each embodiment.

Referring to FIGS. 4A and 4B, a description will be given of a method for detecting an object vector. FIGS. 4A and 4B are explanatory diagrams of an object vector detection method. FIG. 4A illustrates an image signal input to the motion vector detector 145. The motion vector detector 145 disposes a template frame 401 configured to detect a vector from an input image signal, and detects a horizontal vector and a vertical vector at each block position in the template frame 401 between different frames.

FIG. 4B is a histogram (frequency distribution) illustrating a relationship between vectors (horizontal axis) detected by the motion vector detector 145 in a graph and a frequency (vertical axis). In the composition illustrated in FIG. 4A, the detected vectors expressed by the histogram can be roughly divided into two vector groups: an object vector group and a background vector group. Since the user follows the object during panning, typically, the object vector group is more likely to be the vector group having a small motion amount. However, when the user is poor at following the object, the relative shift becomes large between the object and the camera (in other words, the motion vector becomes large). Thus, it may not be always determined that the vector having the small motion amount is the object vector group. In this embodiment, when a value 404 of a vector obtained by converting an angular velocity into the motion amount on the image sensor 132 is within a predetermined range, the camera microcomputer 141 (object blur correction calculator 152) determines the vector as the background vector group. Thereby, the camera microcomputer 141 can determine that a vector group 402 is the object vector group and a vector group 403 is the background vector group in FIG. 4B.

The angular velocity used for this determination may be either an output signal of the angular velocity detector 111 in the interchangeable lens 100) or an output signal of the angular velocity detector 171 in the camera body 130. Both of the output signals of the angular velocity detectors 111 and 171 may be used. The camera microcomputer 141 selects a final object vector among the determined object vector group (vector group 402). A method for selecting the final object vector selects an object vector closest to an in-focus position among the object vector group (vector group 402). As the user sets a focus frame on a targeted position of the object for imaging, the object vector close to the in-focus position of the focus frame may be selected among the object vector group. The camera microcomputer 141 converts the selected object vector [pix] into an object angular velocity [deg/sec] using information such as a focal length and a frame rate.

Next follows a description of a method for calculating a shutter speed suitable for panning. The panning shutter speed calculator 153 in the camera body 130 calculates the shutter speed suitable for panning. The shutter speed suitable for panning is a shutter speed that makes a background blurred with a certain number of pixels or more. In this embodiment, the camera system 10 automatically sets the shutter speed suitable for panning, so that the user can concentrate only on following the object. The user selects a flowing effect of the background (referred to as a follow-shot effect hereinafter) in advance. The shutter speed is calculated based on the selected value so that a certain follow-shot effect is obtained without depending on a focal length or a panning speed of the camera system 10 (angular velocity)

A following expression (1) represents a shutter speed TV using a follow-shot effect α, a focal length f, an angular velocity ω, and an object angular velocity $ω_S$. Here, the follow-shot effect α is a setting value set by the user via the operation unit 136. The focal length f is a focal length of the interchangeable lens 100 obtained via the mount contact portions 115 and 144. The angular velocity ω is detected by the angular velocity detector 171 or the angular velocity detector 111. The object angular velocity as is calculated by the object blur correction calculator 152.

$$TV = \frac{\alpha}{f(\omega - \omega_s)} \quad (1)$$

As the follow-shot effect α, a plurality of setting values are provided such as a flowing effect "small", a flowing effect "medium", and a flowing effect "large". For example, the flowing effect "small" is set to a predetermined value in advance so that the follow-shot effect is 800 [µm] in a moving amount on an imaging plane. Thus, only by the user setting the follow-shot effect, the camera body 130 calculates and automatically sets the shutter speed TV based on the focal length f and the angular velocity ω. Thereby, even when the user is unfamiliar with panning, the shutter speed suitable for panning can be easily set.

Referring now to FIGS. 4A and 3B, a description will be given of zoom panning. FIG. 3A is an explanatory diagram of normal panning that is not the zoom panning, and FIG. 3B is an explanatory diagram of the zoom panning. In the normal panning illustrated in FIG. 3A, a composition is determined immediately before an exposure to follow an object. An image is captured while the focal length is fixed from time immediately before the exposure to the end of the exposure. Thus, the background flows in the same screen's horizontal direction as a direction 301 in which the camera system 10 moves. Since the zoom panning in FIG. 3B varies a focal length so as to fix an object size relative to an imaging angle of view during an exposure period, a background flows in a radial direction 302. Although both FIGS. 3A and 3B are the explanatory diagrams of the panning, the zoom panning in FIG. 3B provides a more lively image such that the object pops out of the screen than the normal panning illustrated in FIG. 3A.

Since the sizes of the objects captured at the angle of view greatly vary between frames during zoom panning, if the shift lens 104 corrects the above object angular velocity as it is, the object blur gets worse. Accordingly, this embodiment multiplies the object angular velocity by a variable gain based on a focal length variation amount that maintains constant the sizes of the objects captured at the angle of view between frames (objects in a first frame and a second frame of the image). Thereby, the object angular velocity suitable for zoom panning can be calculated.

Figure 5A:
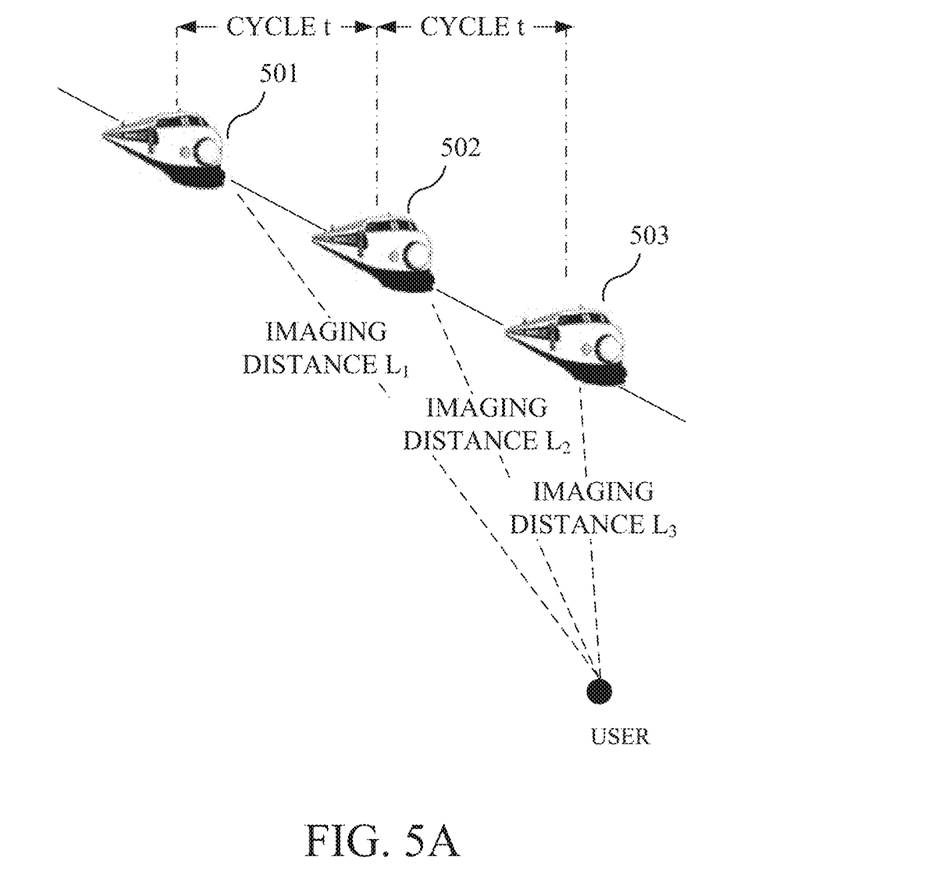
FIGS. 5A and 5B are diagrams illustrating positional relationships between an object and a user during the zoom panning according to each embodiment.
Figure 5B:
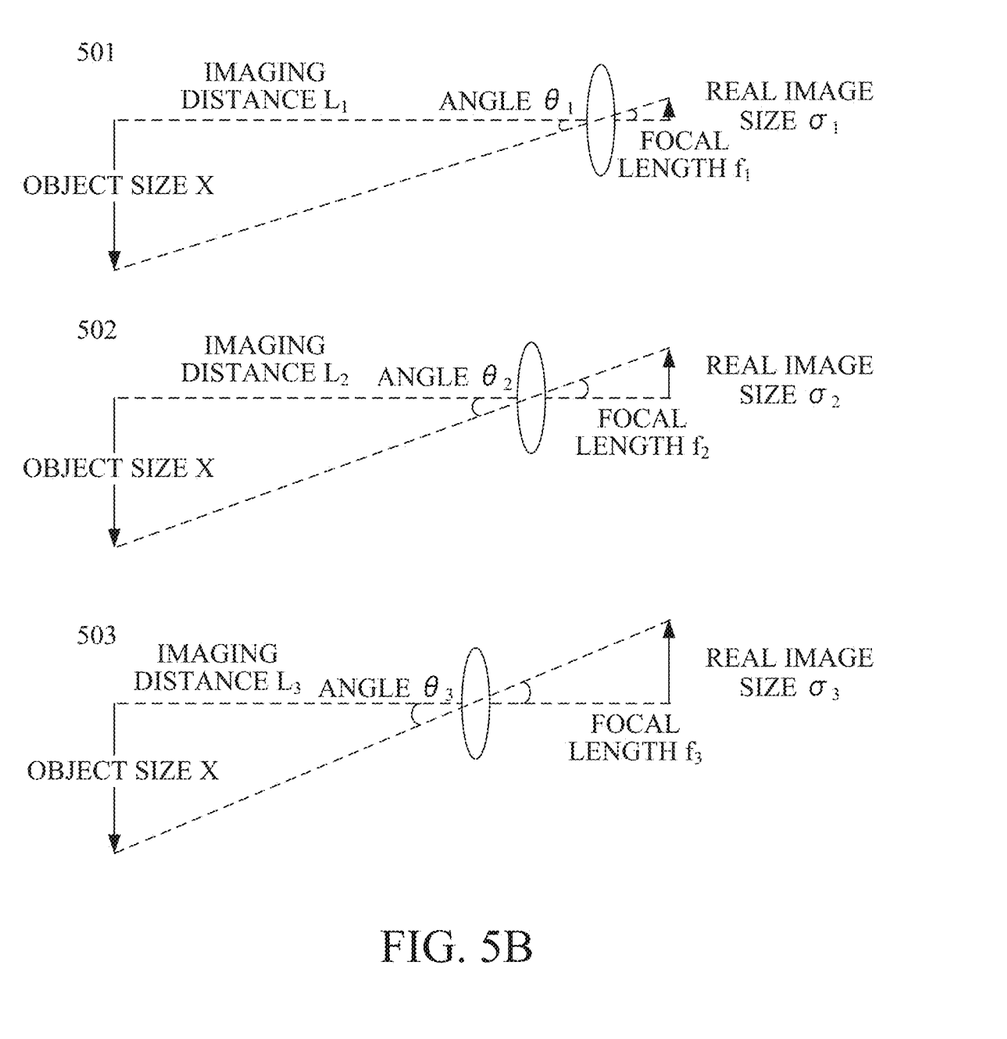

Referring now to FIGS. 5A and 5B, a description will be given of a method for calculating a focal length variation amount according to this embodiment. FIG. 5A is an explanatory diagram illustrating a positional relationship between an object and a user during zoom panning. FIG. 5B is a schematic diagram when the positional relationship between the object and the user illustrated in FIG. 5A is viewed from the top of the image sensor 132.

The following expressions (2) and (3) express the relationship between an object at time 501 in FIG. 5A and an object on the image sensor 132 using respective codes illustrated in FIGS. 5A and 5B.

$$\tan \theta_1 = \frac{X}{L_1} \quad (2)$$

$$\tan \theta_1 = \frac{\sigma_1}{f_1} \quad (3)$$

A following expression (4) is obtained by substituting the expression (2) into the expression (3) and by solving it for an object size X.

$$X = \frac{L_1}{f_1} \sigma_1 \quad (4)$$

Similarly, the following expressions (5) and (6) express relationships between the object and the object appearing on the image sensor 132 at time 502 and time 503, respectively.

$$X = \frac{L_2}{f_2} \sigma_2 \quad (5)$$

$$X = \frac{L_3}{f_3} \sigma_3 \quad (6)$$

The following expression (7) is obtained by substituting the expression (4) into the expression (5) and by solving it for the object (real image size σ₂) on the image sensor 132 at the time 502.

$$\sigma_2 = \left(\frac{f_2}{f_1} \times \frac{L_1}{L_2}\right)\sigma_1 \quad (7)$$

Maintaining constant the sizes of the objects captured between frames corresponds to making the object sizes X at the time 501 and the time 502 equal to each other. In other words, a gain by which the real image size σ in the expression (7) is multiplied is one. When this is formulated by a mathematical expression, the following expression (8) is obtained.

$$\left(\frac{f_2}{f_1} \times \frac{L_1}{L_2}\right) = 1 \quad (8)$$

When the expression (8) is solved for the focal length f₂, the following expression (9) is obtained.

$$f_2 = \frac{L_1}{L_2} f_1 \quad (9)$$

Thus, by changing the focal length f₁ at the time 501 into the focal length f₂ represented by the expression (9), the object (object image) size on the image sensor 132 (the real image sizes σ₁, σ₂ and σ₃) can be maintained constant.

When a current frame is defined as N and a previous frame is defined as N−1, the expression (9) can be expressed as the following expression (10).

$$f_N = \frac{L_{N-1}}{L_N} f_{N-1} \quad (10)$$

In the expression (10), $f_N$ is a focal length in the current frame, $L_N$ is an imaging distance in the current frame, $f_{N-1}$ is a focal length in the previous frame, and $L_{N-1}$ is an imaging distance (object distance) in the previous frame. The following expression (11) expresses a gain G to be multiplied by the object angular velocity during zoom panning.

$$G = \frac{L_{N-1}}{L_N} \quad (11)$$

The object distance (imaging distance L) may be obtained by using an object distance calculated from a position of the focus lens unit (relative distance), or may be obtained by using another measure obtainable of an object distance such as a distance sensor.

Figure 6:
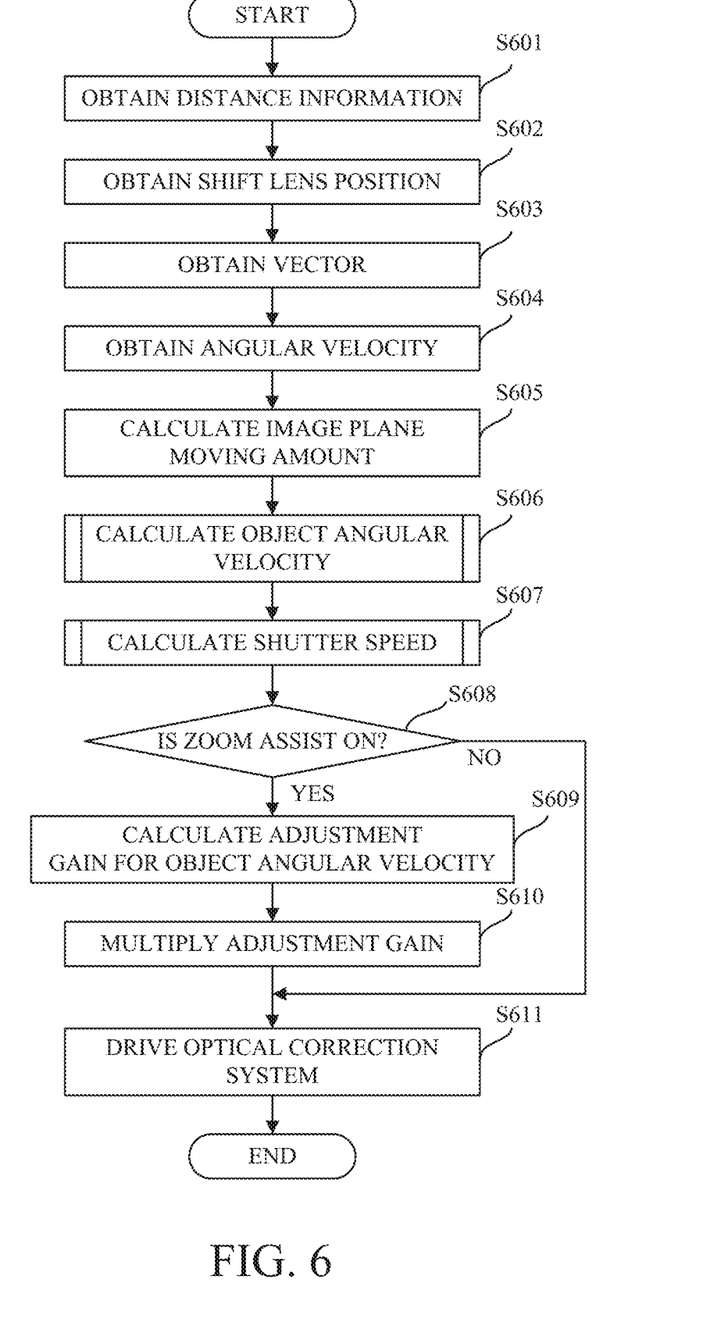
FIG. 6 is a flowchart describing an imaging system control method according to each embodiment.

Referring now to FIG. 6, a description will be given of a control method for the camera system 10 according to this embodiment. Mainly, the camera microcomputer 141 or the lens microcomputer 112 executes each step in FIG. 6. Each step may be executed by the lens microcomputer 112 instead of the camera microcomputer 141, or by the camera microcomputer 141 instead of the lens microcomputer 112.

In the step S601, the camera microcomputer 141 obtains distance information in the image. The camera microcomputer 141 obtains the distance information based on a defocus amount using, for example, focus information of the imaging plane phase difference AF (using the image sensor 132 that detects a focus using the imaging plane phase difference method). However, the present invention is not limited to this embodiment, and distance information may be obtained using an AF sensor (not illustrated) that detects a focus (performs the phase difference AF) by the phase difference detection method.

Next, in the step S602, the camera microcomputer 141 obtains a position of the shift lens 104 (referred to as a shift lens position hereinafter) from the position detector 105. Here, the obtained shift lens position is an average of the output from the position detector 105 synchronized with a detection period of the motion vector detector 145. Subsequently, in the step S603, the camera microcomputer 141 obtains a motion between one previous (or last) frame and the current frame as a vector (namely motion vector) from the motion vector detector 145.

Next, in the step S604, the camera microcomputer 141 obtains an angular velocity from the angular velocity detector 111 in the interchangeable lens 100 and the angular velocity detector 171 in the camera body 130. The obtained angular velocity is an average value of an angular velocity synchronized with the detection period of the motion vector detector 145, similarly to the shift lens position in the step S602. Subsequently, in the step S605, the camera microcomputer 141 calculates a moving amount on an imaging plane (referred to as an image plane moving amount hereinafter) based on the angular velocity obtained in the step S604.

Next, in the step S606, the camera microcomputer 141 or the lens microcomputer 112 calculates an object vector based on the information obtained in the steps S601 to S605 in order to calculate an object angular velocity. A detailed description will be given later for the object angular velocity calculation with reference to FIG. 7. Next, in the step S607, the camera microcomputer 141 (specifically the shutter speed calculator 153) calculates a shutter speed (that is, an exposure time) suitable for panning. A detailed description will be given later for the shutter speed calculation with reference to FIG. 8.

Next, in the step S608, the camera microcomputer 141 determines whether the camera system 10 automatically sets a zoom operation during zoom panning (that is, whether a zoom assist is turned on). If the user sets, via the operation unit 136, the zoom operation to be automatically performed (if the zoom assist is turned on), the flow proceeds to the step S609. On the other hand, if the user sets, via the operation unit 136, the zoom operation to be manually performed (if the zoom assist is turned off), the flow proceeds to the step S611.

In the step S609, the camera microcomputer 141 calculates a gain by which the object angular velocity calculated in the step S606 (referred to as an adjustment gain hereinafter) is multiplied. In this embodiment, the camera microcomputer 141 calculates the adjustment gain based on the above expression (11). Subsequently, in the step S610, the camera microcomputer 141 multiplies the object angular velocity calculated in the step S606 by the adjustment gain for the object angular velocity calculated in the step S609.

In the step S611, the camera microcomputer 141 determines a control signal for driving the shift lens 104 during an exposure period based on the object angular velocity calculated in the step S610 or the step S606 and the shutter speed calculated in the step S607. Thereafter, the camera microcomputer 141 and the lens microcomputer 112 drive the shift lens 104 (the optical correction system) based on the control signal.

Figure 7:
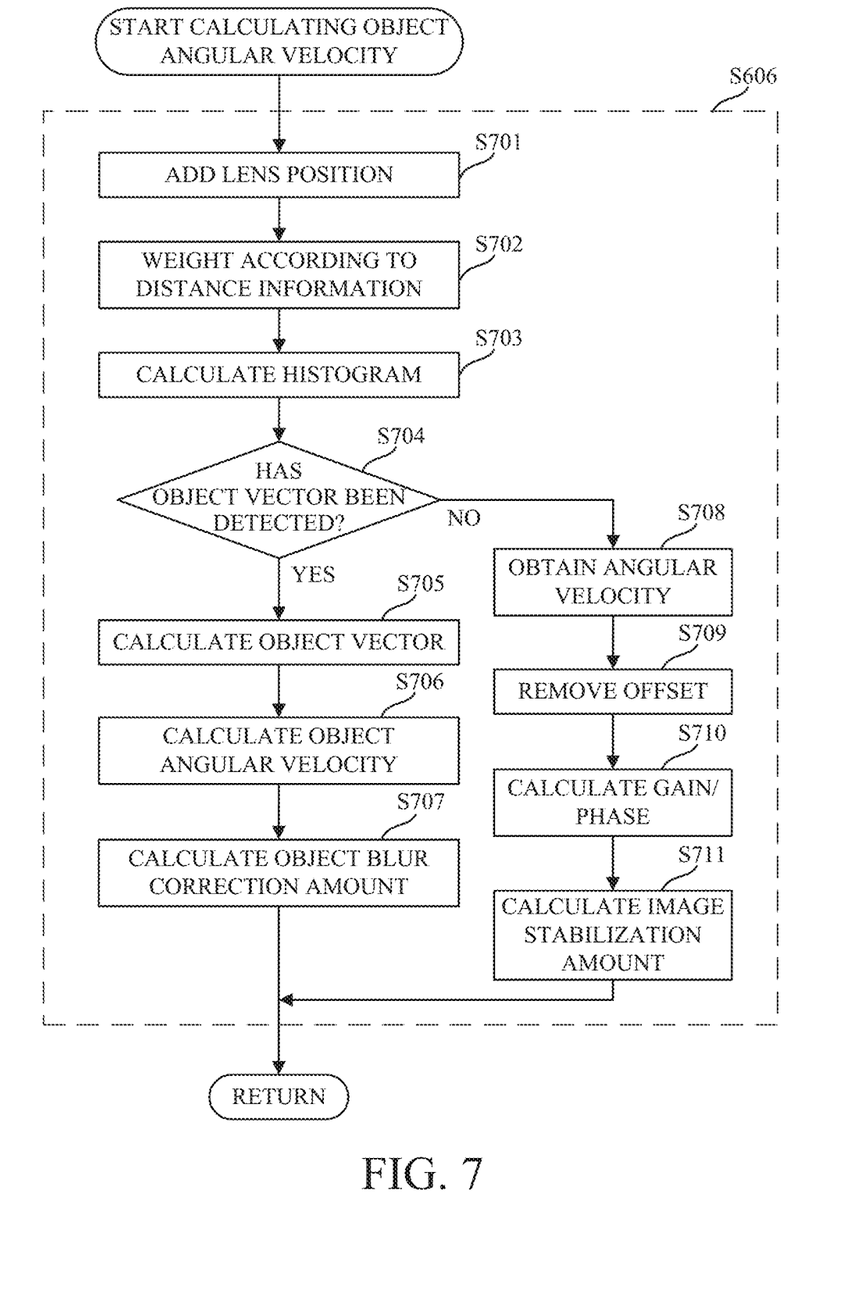
FIG. 7 is a flowchart describing object vector detection (object angular velocity calculation) according to each embodiment.

Referring now to FIG. 7, a description will be given of the object angular velocity calculation in the step S606. Mainly, the camera microcomputer 141 or the lens microcomputer 112 execute each step in FIG. 7. Each step may be executed by the lens microcomputer 112 instead of the camera microcomputer 141, or by the camera microcomputer 141 instead of the lens microcomputer 112.

First in the step S701, the camera microcomputer 141 adds the position of the shift lens 104 (or the shift lens position) obtained in the step S602 to a value detected by the motion vector detector 145. Thereby, by driving the shift lens 104 under image stabilization control during the motion vector detection, an accurate image of the object can be obtained even when the object image varies. Next in the step S702, the camera microcomputer 141 weight each vector detection frame obtained in the step S603 according to the distance information in the image obtained in the step S601. Next, in the step S703, the camera microcomputer 141 calculates a histogram of a vector (motion vector).

Next, in the step S704, the camera microcomputer 141 determines whether an object vector has been detected. If the object vector is detected, the flow proceeds to the step S705, and the camera microcomputer 141 controls an object blur correction. On the other hand, if the object vector is not detected, the flow proceeds to the step S708, and the camera microcomputer 141 controls an image stabilization instead of the object blur correction.

In the step S705, the camera microcomputer 141 selects an object vector to be finally used among the object vector group. A method for selecting the final object vector selects an object vector closest to an in-focus position from the object vector group (vector group 402), but the present invention is not limited to this embodiment. Next, in the step S706, the camera microcomputer 141 calculates an object angular vector based on the object vector by using a method that is opposite to the method in which the angular velocity is converted into the moving amount on the imaging plane (the image plane moving amount) in the step S605.

Next, in the step S707, the angular velocity output unit 222 in the lens microcomputer 112 adds, to the object angular velocity calculated in the step S706, a value transmitted from the lens microcomputer 112 to the camera microcomputer 141. The lens microcomputer 112 integrates, with the integrator 225, the difference between the value transmitted from the camera microcomputer 141 to the lens microcomputer 112 and the angular velocity detected by the angular velocity detector 111 in the interchangeable lens 100, and calculates a target control value for an object blur correction control (referred to as an object blur correction amount hereinafter).

In the step S708, the lens microcomputer 112 and the camera microcomputer 141 switch the control method for the optical correction system to the image stabilization control, since the object vector has not been detected in the step S704. The lens microcomputer 112 obtains the angular velocity of the angular velocity detector 111 in the interchangeable lens 100. Next, in the step S709, the lens microcomputer 112 cuts off a low-frequency component included in the angular velocity using, for example, an HPF having a function of changing its characteristic in an arbitrary frequency band, and outputs a signal of the high-frequency band. Thereby, an offset component superimposed on the angular velocity can be removed.

Next, in the step S710, the lens microcomputer 112 provides signal processing (or calculates the gain and/or phase) using an amplifier that amplifies, with a predetermined gain, the angular velocity from which the offset component has been removed, and a filter circuit composed of a phase compensation filter. Next, in the step S711, the lens microcomputer 112 integrates the angular velocity subjected to the signal processing in the step S710 with the integrator 203, and calculates a target control value for the image stabilization control (or image stabilization amount).

Figure 8:
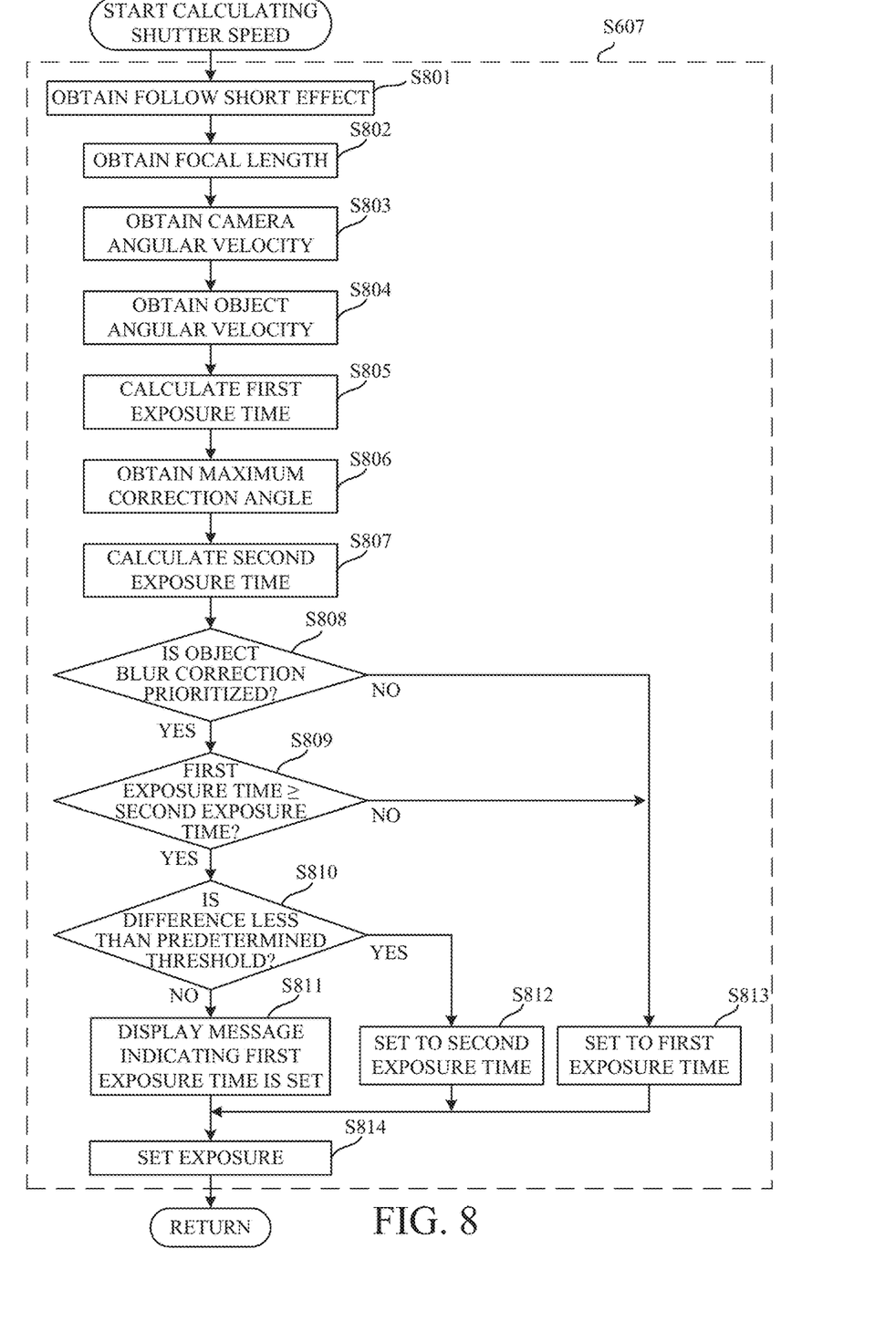
FIG. 8 is a flowchart describing a shutter speed calculation (in other words, an exposure time calculation) suitable for panning according to each embodiment.

Referring now to FIG. 8, a description will be given of the shutter speed calculation (exposure time calculation) suitable for panning in the step S607. Mainly, the camera microcomputer 141 or the lens microcomputer 112 executes each step in FIG. 8. Each step may be executed by the lens microcomputer 112 instead of the camera microcomputer 141, or by the camera microcomputer 141 instead of the lens microcomputer 112.

Initially, in the step S801, the camera microcomputer 141 obtains a setting value of a follow-shot effect set by the user via the operation unit 136. Next, in the step S802, the camera microcomputer 141 obtains a focal length transmitted from the lens microcomputer 112 via the mount contact portions 115 and 144. Next, in the step S803, the camera microcomputer 141 obtains an angular velocity detected by the angular velocity detector 171 (or the camera angular velocity). The camera microcomputer 141 may obtain an angular velocity detected by the angular velocity detector 111 in the interchangeable lens 100.

In the step S804, the camera microcomputer 141 obtains the object angular velocity calculated in the step S706. Next, in the step S805, a shutter speed (referred to as a first exposure time hereinafter) is calculated based on the expression (1), using the data obtained in the steps S801 to S804. Here, the method for setting the shutter speed may be displayed so that the user can select either an automatic setting or a manual setting, and the user accustomed to panning may manually set an arbitrary shutter speed.

Next, in the step S806, the camera microcomputer 141 obtains a maximum correction angle. Next, in the step S807, the camera microcomputer 141 calculates a shutter speed based on the maximum correction angle obtained in the step S806 (referred to as a second exposure time hereinafter).

Next, in the step S808, the camera microcomputer 141 determines whether to give priority to the object blur correction. If the object blur correction is prioritized, the flow proceeds to the step S809. If the object blur correction is not prioritized, the flow proceeds to the step S813.

In the step S809, the camera microcomputer 141 determines whether the first exposure time calculated in the step S805 is equal to or longer than the second exposure time calculated in the step S807. If the first exposure time is equal to or longer than the second exposure time (that is, the first exposure time≥the second exposure time), the flow proceeds to the step S810. If the first exposure time is shorter than the second exposure time (that is, the first exposure time<the second exposure time), the process proceeds to the step S813.

In the step S810, the camera microcomputer 141 determines whether the difference between the first exposure time and the second exposure time is less than a predetermined threshold. If the difference between the first exposure time and the second exposure time is equal to or larger than the predetermined threshold, the flow proceeds to the step S811. If the difference between the first exposure time and the second exposure time is less than the predetermined threshold, the flow proceeds to the step S812.

In the step S811, the camera microcomputer 141 sets the first exposure time calculated in the step S805 and displays a message indicating that the first exposure time has been set. In the step S812, the camera microcomputer 141 sets the second exposure time calculated in the step S807. In the step S813, the camera microcomputer 141 sets the first exposure time calculated in the step S805. Next, in the step S814, the camera microcomputer 141 sets an exposure based on the first exposure time or the second exposure time set in any of the steps S811 to S813.

This embodiment can provide the radially following background and easily capture a fine follow-shot image without an object blur during zoom panning.

Second Embodiment

Next follows a description of a second embodiment according to the present invention. This embodiment is different from the first embodiment in that this embodiment calculates a gain G to be multiplied with an object angular velocity using a motion vector of an image whereas the first embodiment calculates the gain G using the object distance (imaging distance L). In this embodiment, other configurations and operations are the same as those in the first embodiment, and thus a description thereof will be omitted.

In the step S704 in FIG. 7, the camera microcomputer 141 determines whether an object vector has been detected. For example, assume that FIG. 4B is a histogram of vectors in an imaging scene illustrated in FIG. 4A, and the vector group 402 is determined as an object vector group. In the object blur correction by the shift lens 104, one vector is finally selected from among the object vector group 402. Since the gain G is calculated using the object size at an imaging angle of view, it may be sufficient to calculate an area relative to the imaging angle of view of part of a vector determined as the object vector group 402. The area is calculated for each imaging frame, and the gain value of the gain G is the variation amount between a current frame and a previous frame. The object angular velocity calculated in the step S707 may be multiplied by the gain G.

Third Embodiment

A description will now be given of a third embodiment of the present invention. This embodiment differs from the first embodiment and the second embodiment in that this embodiment selectively uses an object distance (imaging distance L) or a motion vector of an image for calculating the gain G to be multiplied with the object angular velocity. In this embodiment, other configurations and operations are the same as those in the first embodiment, and therefore a description thereof will be omitted.

The first embodiment obtains the object distance, for example, from control information of the imaging plane phase difference AF of the camera body 130 (in other words, an output signal from the image sensor 132). This method may not accurately calculate the object distance depending on an aperture value (F-number) of the interchangeable lens 100 attached to the camera body 130, and calculates the gain G with the less reliable distance information. In that case, the gain G is used which is calculated based on the motion vector of the captured image described in the second embodiment. In addition, the motion vector may have low detection accuracy, and for example, in a dark imaging environment such as an imaging luminance of EV0, the vector detection accuracy becomes lower since the image has low contrast. When the vector is less reliable, the liquid crystal panel (LCD) 140 displays a message instructing a user to capture an image under a suitable imaging environment.

Thus, in each embodiment, a control apparatus (including the lens microcomputer 112 and the camera microcomputer 141) includes a calculating unit (obtaining unit) (the panning controller 122 and the zoom panning controller 154) and a correcting unit (the image stabilization controller 121 and the zoom panning controller 154). The calculating unit calculates a focal length variation amount for reducing an object size variation in an image during panning. The correcting unit calculates a blur correction amount for controlling an image stabilizer (the shift lens 104 and the driver 113) for correcting a blur based on the blur detected by a shake detector (the angular velocity detectors 111 and 171). The correcting unit changes the blur correction amount based on a focal length variation amount.

The calculating unit may calculate the focal length variation amount for reducing an object size variation between images in each of a first frame and a second frame (in other words, different frame images). The calculating unit may calculate an object angular velocity using a variable gain (gain G) based on the focal length variation amount. The correcting unit may control the image stabilizer based on the object angular velocity.

The calculation unit may calculate the variable gain based on an object distance (distance from a user to an object, that is, imaging distance L). The object distance may be obtained using an AF sensor that detects a focus by a phase difference detection method. The object distance may be obtained by using an image sensor configured to detect the focus by an imaging plane phase difference method. The calculating unit may calculate the variable gain based on a motion vector of an image. The calculating unit may calculate the variable gain based on the object distance or the motion vector of the image. The calculating unit may calculate the variable gain based on the object distance if accuracy of the object distance is higher than predetermined accuracy, and may calculate a variable gain based on the motion vector if the accuracy of the object distance is lower than the predetermined accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can set a proper object blur correction amount while automatically setting a zoom operation during zoom panning. Each embodiment can provide a control apparatus, an imaging apparatus, a lens apparatus, a control method, and a storage medium, each of which can accurately correct an object blur during zoom panning.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-048377, filed on Mar. 15, 2019 which is hereby incorporated by reference herein in its entirety.

What is claimed is:

1. A control apparatus comprising:
at least one processor; and
at least one memory coupled to the at least one processor storing instructions that, when executed by the at least one processor, cause the at least one processor to function as:
  a detecting unit configured to detect an object from an obtained image signal;
  an obtaining unit configured to obtain a variation amount of a focal length over time for reducing a size variation of the object detected by the detecting unit;
  a correcting unit configured to obtain a blur correction amount for controlling an image stabilizer configured to correct a blur; and
  a setting unit configured to set a mode to a mode in which a focal length is automatically changed and to a mode in which the focal length is changed by a user,
  wherein the correcting unit changes an obtaining method of the blur correction amount depending on whether the mode in which the focal length is automatically changed is set or the mode in which the focal length is changed by the user is set, and
  wherein when the mode in which the focal length is automatically changed is set, the correcting unit obtains the blur correction amount based on the blur detected by a shake detector, the variation amount of the focal length over time obtained by the obtaining unit, and a focal length at a time of detection of the blur.

2. The control apparatus according to claim 1, wherein the obtaining unit obtains the variation amount of the focal length when the mode in which the focal length is automatically changed is set in an imaging apparatus that obtains the image signal.

3. The control apparatus according to claim 1, wherein the obtaining unit obtains the variation amount of the focal length over time for reducing a size variation of the object in each of a first frame and a second frame of the image.

4. The control apparatus according to claim 1, wherein the obtaining unit obtains an object angular velocity using a variable gain based on the variation amount of the focal length over time.

5. The control apparatus according to claim 4, wherein the correcting unit controls the image stabilizer based on the object angular velocity.

6. The control apparatus according to claim 4, wherein the obtaining unit obtains the variable gain based on an object distance.

7. The control apparatus according to claim 6, wherein the object distance is obtained by an AF sensor configured to detect a focus using a phase difference detection method.

8. The control apparatus according to claim 6, wherein the object distance is obtained by an image sensor configured to detect a focus using an imaging plane phase difference method.

9. The control apparatus according to claim 4, wherein the obtaining unit obtains the variable gain based on a motion vector of an image.

10. The control apparatus according to claim 4, wherein the obtaining unit obtains the variable gain based on an object distance or a motion vector of an image.

11. The control apparatus according to claim 10, wherein the obtaining unit obtains the variable gain based on the object distance when accuracy of the object distance is higher than predetermined accuracy, and wherein the obtaining unit obtains the variable gain based on the motion vector when the accuracy of the object distance is lower than the predetermined accuracy.

12. The control apparatus according to claim 1, further comprising:

an image sensor.

13. The control apparatus according to claim 1, further comprising:

an imaging optical system.

14. The control apparatus according to claim 1, wherein the variation amount of the focal length over time is a ratio of focal lengths.

15. The control apparatus according to claim 1, wherein the blur correction amount is a blur correction amount during imaging at a set shutter speed.

16. The control apparatus according to claim 1, wherein the variation amount of the focal length over time indicates a rate of variation amount of the focal length during imaging.

17. The control apparatus according to claim 1, wherein when the mode in which the focal length is automatically changed is set, the correcting unit obtains the blur correction amount based on the blur detected by the shake detector, the variation amount of the focal length over time obtained by the obtaining unit and the focal length at a time of detection of the blur, and wherein when the mode in which the focal length is changed by the user is set, the correcting unit obtains the blur correction amount based on the blur detected by the shake detector and the focal length at a time of detection of the blur.

18. The control apparatus according to claim 1, wherein when the mode in which the focal length is automatically changed is set, the focal length is automatically changed during an exposure period.

19. A control method comprising steps of:

detecting an object from an obtained image signal;

obtaining a variation amount of a focal length over time for reducing a size variation of the object detected at the detecting step;

changing an obtaining method of a blur correction amount depending on whether a mode in which a focal length is automatically changed is set or a mode in which the focal length is changed by a user is set; and obtaining, when the mode in which the focal length is automatically changed is set based on the blur detected by a shake detector, the variation amount of the focal length over time, and a focal length at a time of detection of the blur, the blur correction amount for controlling an image stabilizer configured to correct a blur.

20. A non-transitory computer-readable storage medium storing a computer program that causes a computer to execute the control method according to claim 19.

* * * * *